United States Patent [19]

Sullivan et al.

[11] 4,111,443

[45] Sep. 5, 1978

[54] CONTROL SYSTEM FOR ENERGIZING ELECTRICAL RESISTANCE HEATERS IN COOKING FLUIDS

[75] Inventors: Neal Sullivan, Nashville; George E. Cook, Franklin, both of Tenn.

[73] Assignee: KFC Corporation, Louisville, Ky.

[21] Appl. No.: 793,401

[22] Filed: May 3, 1977

Related U.S. Application Data

[63] Continuation of Ser. No. 600,135, Jul. 30, 1975, abandoned.

[51] Int. Cl.² .............................................. H05B 1/02
[52] U.S. Cl. .................................. 219/497; 219/492; 219/494; 219/501
[58] Field of Search ............... 219/480, 483, 486, 490, 219/494, 497, 499, 501, 504, 505; 236/93; 99/330, 408, 400

[56] References Cited

U.S. PATENT DOCUMENTS

| | | | |
|---|---|---|---|
| 3,479,487 | 11/1969 | Stoll | 219/494 |
| 3,553,429 | 1/1971 | Nelson | 219/497 |
| 3,560,712 | 2/1971 | Toohill | 219/497 X |
| 3,566,079 | 2/1971 | O'Neill | 219/501 X |
| 3,814,902 | 6/1974 | Fann | 219/497 |

*Primary Examiner*—J. V. Truhe
*Assistant Examiner*—M. Paschall

[57] ABSTRACT

A system for controlling energization of an electrical resistance heater disposed in heat exchanging relation with a food cooking medium includes a signal generator providing an output signal of amplitude-time character defining a preselected cooking cycle, an element in the cooking medium providing a control signal indicative of cooking medium temperature and circuitry interconnecting an electrical voltage supply with the heater for excitation thereof responsively to both the control signal and the signal generator output signal.

6 Claims, 3 Drawing Figures

4,111,443

CONTROL SYSTEM FOR ENERGIZING ELECTRICAL RESISTANCE HEATERS IN COOKING FLUIDS

This is a continuation of application Ser. No. 600,135, filed July 30, 1975 now abandoned.

FIELD OF THE INVENTION

This invention relates to systems for controlling energization of an electrical resistance heater and more particularly to systems for controlling energization of an electrical resistance heater disposed in a cooking medium.

BACKGROUND OF THE INVENTION

Various systems are presently known for cooking food, such as chicken parts, in a hot liquefied cooking medium, such as fat or shortening, as set forth in U.S. Pats. Sanders No. 3,245,800, Keathley No. 3,431,834, Angold No. 3,431,835 and Pelster et al. No. 3,608,472. As disclosed in the last-mentioned patent, one known system of this type includes a pressurized cooking chamber served by a supply of liquefied cooking medium which is heated by electrical heaters responsively to a thermostat in the medium.

The supply of no more than the amount of heat needed at any given time to maintain a preselected constant temperature in cooking systems has advantage not only in conforming heating to that required for quality control of the cooked product but also in conserving energy and in prolonging the life of heaters and the heating medium. Thus, the cycling of heaters full on and full off a number of times during the cooking cycle, as occurs with simple thermostat controllers, loosens quality control limits and tends to increase carbon accumulation on the heaters, in turn deteriorating the cooking medium.

SUMMARY OF THE INVENTION

The foregoing shortcomings in presently known systems for food cooking are more of concern where, as in the present invention, a given cooking cycle requires the cooking medium temperature to be at a level varying with time in preselected manner.

It is thus an object of the present invention to provide a system for controlling electrical heater excitation to closely conform the temperature of a cooking medium to predetermined time-varying temperatures.

It is an additional object of the invention to provide for energy conservation in food cooking systems.

It is a still further object of the invention to provide a system for controlling electrical heater energization to avert deterioration of a cooking medium.

In attaining these and other objects, the invention provides a signal generator providing an output signal prescribing a distince amplitude-time characteristic indicative of a corresponding heating temperature-time characteristic associated with a particular cooking cycle, a temperature-sensitive element in the cooking medium generating a control signal indicative of cooking medium temperature and circuitry for interconnecting an electrical heater with a voltage supply responsively to both the control signal and the signal generator output signal. Preferably, the voltage supply is of multiphase type and the circuitry interconnects the voltage supply and heater for time periods of extents proportionally related to the amplitudes of both the control signal and the signal generator output signal whereby electrical power is supplied to the heater only to the extent required for maintenance of the temperature demanded of the cooking medium for such cooking cycle.

The foregoing and other objects and features of the invention will be evident from the following detailed description of a preferred embodiment thereof and from the drawings wherein like reference numerals are used to identify like parts throughout.

DESCRIPTION OF THE PREFERRED EMBODIMENT

Figure 1:
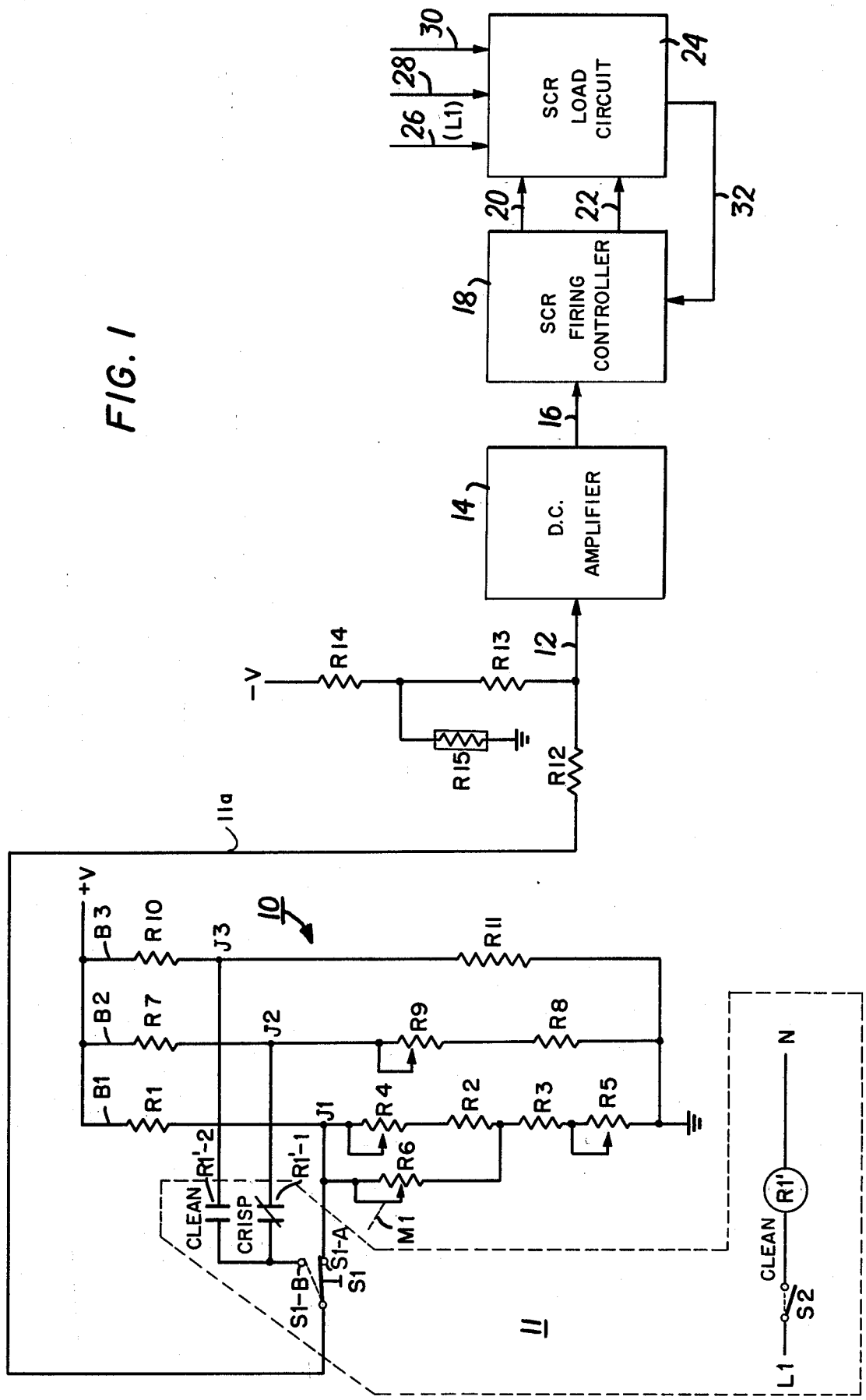
FIG. 1 is a functional block diagram of a control system embodiment in accordance with the invention with signal generator unit 10, switching assembly 11 and temperature feedback circuitry thereof shown in electrical schematic.

Referring to FIG. 1, reference numeral 10 designates a signal generator unit providing a direct current (d.c.) output signal conducted through switching assembly 11 and applied to line 12. This signal is amplified in d.c. amplifier 14 whose output signal is applied by line 16 to silicon controlled rectifier (SCR) firing controller 18. Controller 18 applies a potential difference, i.e., the voltage difference between its output lines 20 and 22, to SCR load circuit 24. Circuit 24 has applied thereto multiphase alternating current voltage, e.g., three-phase voltage, on lines 26, 28 and 30. Circuit 24 supplies d.c. excitation to controller 18 over line 32.

Considering signal generator unit 10 in detail, the same includes three resistive branches B1, B2 and B3 connected in parallel between a source of positive voltage (+V, e.g., +15V) and ground. Branch B1 includes series-connected fixed resistors R1, R2 and R3 and variable resistors R4 and R5 and a potentiometer R6 (cam-driven as at M-1) such as is commercially-available from Servo Instruments Corporation as product No. 20 TW-16.42. Branch B1 generates an output signal at junction J1 of amplitude initially indicative of a cooking temperature of approximately 375° F with a controlled (programmed) decline with the passage of time, brought about by resistor R6, to an amplitude indicative of a cooking temperature of approximately 250° F.

Branch B2 of unit 10 includes fixed resistors R7 and R8 and variable resistor R9 and provides an output signal at junction J2 of amplitude constant with the passage of time and indicative of a cooking temperature of approximately 350° F. and variable therefrom by positioning of the wiper of resistor R9. Branch B3 includes fixed resistors R10 and R11, and provides an output signal at junction J3 of amplitude constant with the passage of time and indicative of a temperature of approximately 185° F.

Junctions J1, J2 and J3 are connected through switching assembly 11 to line 11a, in turn connected through resistor R12 to line 12. Resistors R13 and R14 connect line 12 to a source of negative voltage (−V, e.g., −15V) with R15 connecting the junction of resistors R13 and R14 to ground. R15 is a commercially available platinum resistor submerged in the heating medium and having a positive coefficient of change with temperature change. Such resistor is preferably a product of Lewis Engineering Company, namely, Product No. 1119008.

Switching assembly 11 includes switches S1 and S2. Switch S1 has contact S1-A connected to junction J1 and switch contact S1-B connected to junction J2 through normally-closed contacts R1'-1 of relay R1' and to junction J3 through normally-open contacts R1'-2 of R1'. R1' is connected between supply phase L1 and neutral N through switch S2.

In adaptation of unit 10 specifically for the generation of output signals indicative of preselected temperatures to which a heating medium is to be conformed during plural cooking cycles and a cleaning cycle, branches B1, B2 and B3 provide signals having respectively different characteristics. In intended application of the subject system to the cooking of chicken parts, the branch B3 output signal is to be employed during periods in which it is desired to clean cooking apparatus with such as a water and cleaning solution, the branch B2 output signal provides for the cooking of crisp chicken and the branch B1 signal is employed in the cooking of regular chicken. For the cleaning operation, the contact arms of switches S1 and S2 are placed in their broken line positions in FIG. 1, providing for connection of line 11a to junction J3 through contacts R1'-2. For cooking regular chicken, the contact arm of switch S1 is placed in its solid line FIG. 1 position with the contact arm of switch S2 in its solid line position whereby junction J1 is connected directly to line 11a. For crisp chicken cooking, the contact arm of switch S1 is placed in its broken line position in FIG. 1 and the switch S2 contact arm is place in its solid line position whereby junction J2 is connected to line 11a through contacts R1'-1.

Figure 2:
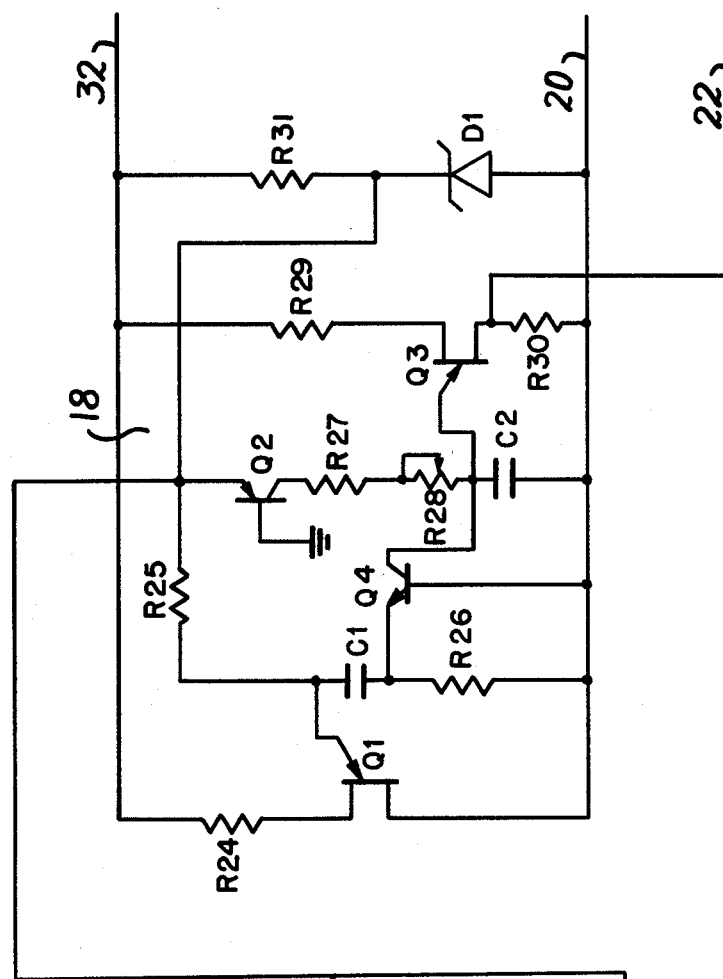
FIG. 2 is an electrical schematic diagram of preferred circuitry for amplifier 14 and controller 18 of FIG. 1.

Turning now to FIG. 2, amplifier 14 may be seen to comprise a pair of operational amplifiers including amplifying units A1 and A2 with associated input and feedback resistors R16 through R22 and output resistor R23. Units A1 and A2 may comprise Motorola MC 1741 CP1. The amplifier output signal on line 16 is applied to SCR firing controller 18 in a manner discussed below.

Controller 18 is a variant of polyphase SCR circuitry of type shown and explained in detail in the second edition of the SCR manual of the General Electric Company at pages 127 and following. Controller 18 is comprised of resistors R24 through R31, transistors Q1 through Q4, capacitors C1–C2 and Zener diode D1 as connected between lines 20 and 32. Transistor Q3 is a unijunction transistor, the firing angle of which is controllable to provide for voltage change between lines 20 and 22 at selected times for purposes discussed below. Line 32 supplies d.c. voltage to controller 18 also as discussed below. Transistor Q3 and associated capacitor C2 form a unijunction transistor relaxation oscillator firing circuit, the firing angle of which is controlled by regulating the charging rate of capacitor C2. Such charging rate is dependent on conduction in transistor Q2 as influenced by the line 16 signal issuing from d.c. amplifier 14. On conduction in Q3, the voltage across resistor R28 changes providing the voltage difference between lines 20 and 22. Transistors Q1 and Q4 function to prevent Q3 from firing at any delay angle greater than 120° with respect to a reference phase of the multiphase voltage (FIG. 1).

Figure 3:
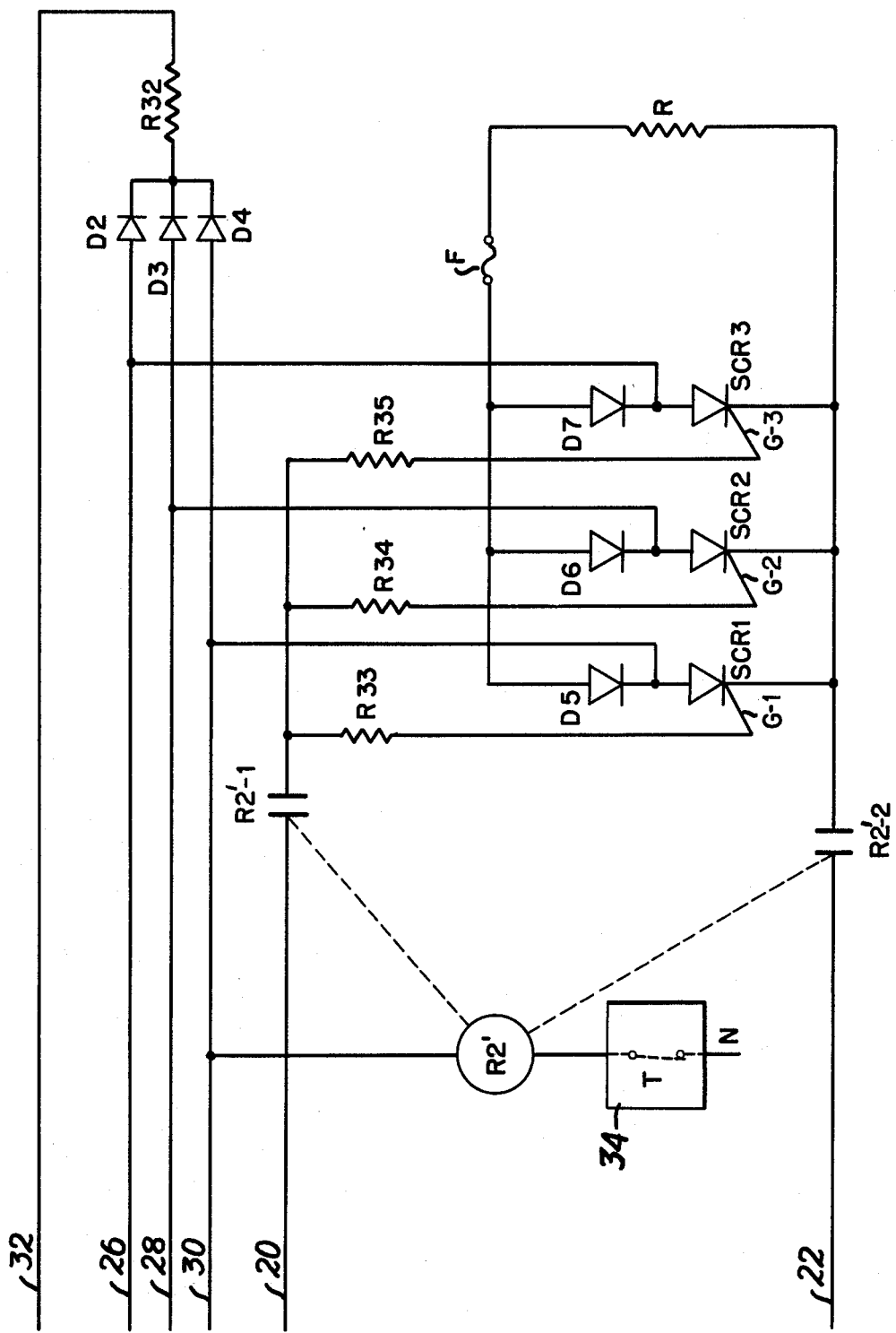
FIG. 3 is an electrical schematic diagram of preferred circuitry for load circuit 24 of FIG. 1.

Referring to FIG. 3, it will be seen that line 32 d.c. voltage provided to controller 18 (FIG. 2) is provided through rectification diodes D2 through D4 and resistor R32, on positive excursions of the three-phase voltages on lines 26, 28 and 30. Since the positive excursions of two individual phases always overlap in time, line 32 is constantly furnished with d.c. voltage.

The FIG. 3 circuit arrangement includes electrical resistance heating element R, fuse F, SCR1 through SCR3 and diodes D5 through D7 connected respectively in series with the SCRs. The gating electrodes G-1, G-2 and G-3 of the SCRs are connected in common through resistors R33, R34 and R35 and then through normally-open relay contacts R2'-1 to line 20. The cathodes of the SCRs are connected in common and then through normally-open relay contacts R2'-2 to line 22. Relay R2' has its control coil connected from line 30 to neutral in series circuit with a suitable protective circuit 34, which may include a thermostat T for prohibiting energization of R2', e.g., when the cooking medium is above a preselected high temperature beyond which additional heating is hazardous. With relay R2' energized, contacts R2'-1 and R2'-2 thereof are closed providing interconnection of lines 20 and 22 with the SCR gating electrodes and cathodes.

When the line 26 voltage is in a positive excursion D7 is reverse-biased and hence non-conductive. Likewise, when the voltage on line 28 is in a positive excursion, diode D6 is non-conductive, and when the line 30 voltage is in a positive excursion, diode D5 is non-conductive. Accordingly, current flow through D5 can occur only during periods in which the line 30 voltage is in a negative excursion, current flow through D6 can occur only during periods in which the line 28 voltage is in a negative excursion and current flow through D5 can occur during periods in which the line 26 voltage is in a negative excursion.

Since the negative excursions of two individual phases always overlap in time, at least one of diodes D5, D6 and D7 is always forward-biased. Thus, when no potential difference exists between lines 20 and 22, i.e., no SCR is fired, heater R is continually deenergized. On the other hand, when an SCR-firing potential is present between lines 20 and 22, gates G-1, G-2 and G-3 receive gating signals, thereby energizing heater R.

By the subject system arrangement, energization of heater R occurs for time periods of extents proportionally related to the amplitudes of both the control signal issuing from the temperature feedback circuit including resistors R13 and R15 and the output signal of unit 10. Thus, the output voltage of amplifier 14 of FIG. 1 is dependent on the voltage at J1, J2 or J3 as determined by the setting of switches S1 and S2 and affected by the resistance value of resistor R15 as influenced by the heating medium. Where this circuitry generates a heating demand signal, the same is conveyed to controller 18 by line 16 voltage change and the controller in turn generates a potential difference between lines 20 and 22, energizing heater R. On generation of a heating discontinuance signal, controller 18 responds by timely discontinuing the potential difference between lines 20 and 22 and heater R is deenergized until subsequent generation of a heating demand signal.

The table below lists components and parameters for practicing the invention. Resistances are in ohms and capacitance values in microfarads.

| R1 | 8.2 K | R29 | 390 |
|----|-------|-----|-----|
| R2 | 390   | R30 | 100 |
| R3 | 560   | R31 | 100 |

-continued

| | | | |
|---|---|---|---|
| R4 | 10 K | R32 | 7.5 K |
| R5 | 200 | R33 | 24 |
| R6 | 125 | R34 | 24 |
| R7 | 8.2 K | R35 | 24 |
| R8 | 330 | R | 13.7 |
| R9 | 200 | | |
| R10 | 8.2 K | C1 | 1 |
| R11 | 330 | C2 | 0.5 |
| R12 | 680 K | | |
| R13 | 680 K | D1 | 1N4747 |
| R14 | 8.2 K | D2 | 1N5060 |
| R15 | 500 | D3 | 1N5060 |
| R16 | 330 K | D4 | 1N5060 |
| R17 | 1 M | D5 | 1N3291 |
| R18 | 470 K | D6 | 1N3291 |
| R19 | 10 K | D7 | 1N3291 |
| R20 | 10 K | | |
| R21 | 10 K | Q1 | 2N2646 |
| R22 | 27 K | Q2 | 2N5355 |
| R23 | 100 K | Q3 | 2N2646 |
| R24 | 390 | Q4 | 2N2923 |
| R25 | 1.8 K | | |
| R26 | 100 | SCR1 | 2N1916 |
| R27 | 470 | SCR2 | 2N1916 |
| R28 | 5 K | SCR3 | 2N1916 |

Various changes and modifications made evident to those skilled in the art may be introduced in the foregoing particularly disclosed control system without departing from the spirit or scope of the invention. Thus, the preferred embodiment above discussed and shown in the drawings is intended in an illustrative and not in a limiting sense. The true spirit and scope of the invention is set forth in the following claims.

What is claimed is:

1. A system for controlling excitation of an electrical resistance heater by a multiphase supply of electrical voltage to conform the temperature of a cooking fluid to first or second predetermined temperature-time characteristics, comprising:
   (a) a signal generator means for generating first and second output signals having amplitude-time characteristics respectively indicative of temperature constant with passage of time and temperature decreasing with the passage of time;
   (b) switch means for receiving said output signals and having a terminal, said switch means being settable to apply any selected one of said output signals to said terminal;
   (c) temperature-sensitive means contained in said fluid for generating a control signal indicative of the temperature of said fluid; and
   (d) circuit means connected to said switch means terminal and said temperature-sensitive means and responsive to both said selected output signal and said control signal for interconnecting said heater with said voltage supply during time extents proportionally related to the amplitudes of both said selected output signal and said control signal.

2. The system claimed in claim 1 wherein said signal generator means includes a circuit for generating a constant amplitude signal constituting said first output signal.

3. The system claimed in claim 1 wherein said signal generator means includes a circuit for generating a signal having amplitude decreasing with the passage of time and constituting said second output signal.

4. The system claimed in claim 1 wherein said signal generator means includes a first circuit generating a constant amplitude signal constituting said first output signal and a second circuit generating a signal having amplitude varying with the passage of time and constituting said second output signal.

5. The system claimed in claim 4 wherein said signal generator means generates a third output signal having an amplitude-time characteristic indicative of a third predetermined temperature-time characteristic, said signal generator means including a third circuit generating a constant amplitude signal constituting said third output signal, said first and third output signals having respectively different constant amplitudes.

6. The system claimed in claim 1 wherein said circuit means includes a first circuit providing a composite signal indicative of the combined amplitudes of said selected output signal and said control signal, a unijunction transistor relaxation oscillator firing circuit responsive to said composite signal and a silicon controlled rectifier circuit controlled by said firing circuit to in turn control said interconnecting of said heater with said voltage supply.

* * * * *